E. B. KING.
TRUCK.
APPLICATION FILED MAY 8, 1911.
1,012,139.
Patented Dec. 19, 1911.
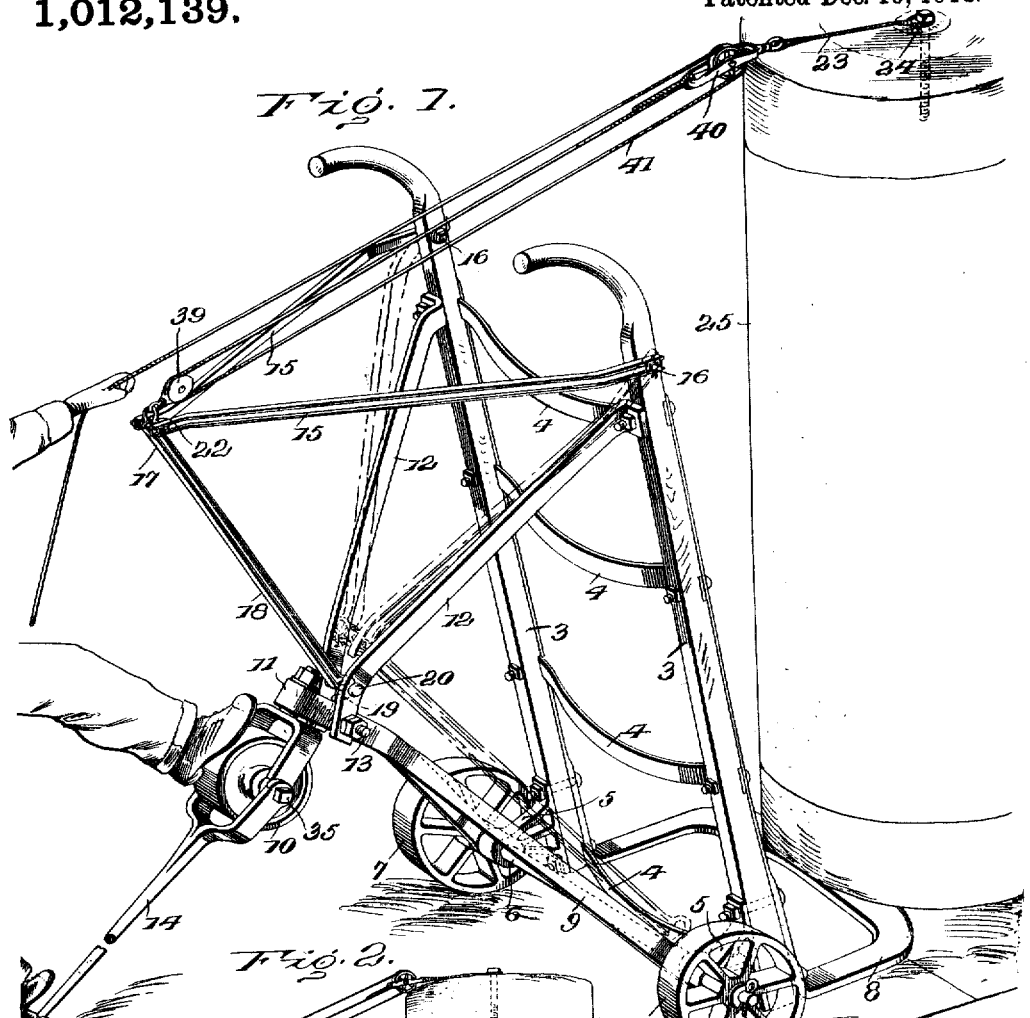

UNITED STATES PATENT OFFICE.

ERBIE B. KING, OF DEANWOOD, DISTRICT OF COLUMBIA, ASSIGNOR TO FLEMING NEWBOLD, OF WASHINGTON, DISTRICT OF COLUMBIA.

TRUCK.

1,012,139.      Specification of Letters Patent.      Patented Dec. 19, 1911.

Application filed May 8, 1911. Serial No. 625,694.

*To all whom it may concern:*

Be it known that I, ERBIE B. KING, of Deanwood, District of Columbia, have invented a new and useful Improvement in Trucks, which invention is fully set forth in the following specification.

My invention relates to trucks, especially hand-trucks, and more particularly concerns the provision of means operating in conjunction with a truck to facilitate and expedite the loading onto the truck of heavy and bulky objects with a minimized expenditure of manual labor.

In short, my object is to enable one man to readily and safely load onto a truck heavy and bulky objects the loading of which without my invention ordinarily requires the combined efforts of two or more men.

In newspaper printing establishments, for example, rolls of paper weighing as much as 1500 pounds, from six to seven feet in length and from three to four feet in diameter, are loaded onto hand-trucks which are used to transport such rolls from their place of storage to the printing press. The loading of such a roll of paper onto a hand-truck has heretofore ordinarily required the combined efforts of at least two and for safety three or more men. With the means provided by my invention it has been demonstrated that one man can readily load such a roll onto the hand-truck, thus dispensing with the assistance, time and expense of one or more helpers. From this illustration of the practical usefulness of the invention its adaptability to the loading of wide variety of heavy and bulky objects onto trucks will be apparent.

The invention can be most readily understood in detail by reference to the accompanying drawing illustrative thereof, wherein—

Figure 1 is a perspective view showing a paper-roll about to be loaded onto a truck embodying my invention in what is at present believed to be its preferred form; Fig. 2 is a similar view showing the invention embodied in a different form; and Fig. 3 is a sectional detail view.

I have shown my invention applied to a type of hand-truck designed and manufactured especially for transporting paper-rolls, and consisting of side bars 3, 3 bent at one end to constitute handles; rigid straps 4 connecting the side bars; castings 5, 5 fixed to the side bars and constituting bearings for the axle 6 carrying wheels 7, 7; foot-piece 8 to be inserted under the object to be loaded; a V-shaped frame 9 with the ends of its diverging arms embracing axle 6; and at its pointed end carrying a third wheel 10 swiveled in a socket 11; two braces 12, 12, each bolted at one end to a side bar 3; said braces converging toward their other ends which bear against opposite sides of the pointed end of the frame 9 and are fastened thereto by bolt 13; and a handle 14, connected to the projecting ends of axle 35 of wheel 10, and adapted to be used in pulling the truck along when it is loaded with all three wheels bearing upon the floor, pavement or the like. In equipping such a truck with my invention in what is now believed to be its preferred form, I pivot a rod or bar 15 to each side bar 3 (near its handle-end) by means of a bolt or headed pin 16. Rods 15, 15 converge toward their other ends where they are connected by a bolt or pin 17 which also passes through the interposed end of a rod or bar 18. At its other end rod 18 is formed with a hook 19 adapted to engage a pin or bolt 20 which latter spans the space between and passes through bars 12, 12. The rods 15, 15 and 18, in the position shown in full lines, Fig. 1, constitute a rigid projecting frame or skeleton-arm the outer end of which is substantially distant from the truck and to which outer end there is connected a suitable leverage means, preferably a block and tackle consisting of two single pulleys 39 and 40 and a rope 41. A link 22 on bolt 17 passes through the eye of pulley 39. To the eye of pulley 40 there is connected some suitable means for engaging the object to be loaded; for paper-rolls this means may be a flexible rope, chain or the like, 23, with a pin or bolt 24 adapted to be inserted in the end of the hollow or tubular spool of the paper roll. When the frame or skeleton arm is not in use, it may be swung to the out-of-the-way position shown in dotted lines (Fig. 1) by disengaging hook 19 from pin 20.

In loading a paper roll 25, for example, the truck is first brought to the upright position shown in Fig. 1 with the foot-piece 8 inserted under the roll and the pin 24 engaged in the upper end of the roll spool. With one foot on the handle 14, the operator actuates the block and tackle which by reason of its leverage enables the operator to easily tilt the heavy and massive roll toward and onto the truck, whereupon the truck, under the weight of the load, swings toward a horizontal position until its wheel 10 contacts the floor or pavement.

In the embodiment shown in Fig. 2, instead of being pivotally connected to the truck proper, the skeleton-arm or frame is adapted to be removed from the truck when not in use and is in the form of a tetrahedial frame made up of a rod 26 bent to triangular form and rods 27, 28 and 29 joined together at one end by a bolt 30 and at their other ends joined respectively to the angles of the triangular frame of rod 26. As shown in Fig. 3, the lower end of rod 29 is extended beyond the ends of rods 27 and 28, and bent to form a hook engaging under the lower edge of bar 9, where said bar is doubled upon itself, between the socket 11 and the lower ends of braces 12, 12. Rod 26 extends across and bears against braces 12, 12. When this frame is not in use it is lifted away from the truck proper. The rods 15, 15, 18, of Fig. 1 and 26, 27, 28 and 29, Fig. 2, are preferably made of channel-iron for lightness and strength.

What I claim as new is:—

1. The combination with a truck, of a rigid arm or frame projecting substantially distant from said truck, and leverage means for connection between said arm or frame at its projecting end and an object to be loaded and adapted to be manually operated to tilt said object onto the truck.

2. The combination of a truck, of a rigid arm or frame projecting substantially distant from said truck, and a block and tackle for connection between said arm or frame at its projecting end and an object to be loaded and adapted to be manually operated to tilt said object onto the truck.

3. The combination with a hand-truck having a foot-piece adapted to be inserted under an object to be loaded by bringing the truck to an upright position, of a rigid arm or frame projecting substantially distant from said truck, and leverage means for connection between said arm or frame at its projecting end and said object and adapted to be manually operated to tilt said object onto the truck.

4. The combination with a hand truck, of a rigid arm or frame associated with said truck and adapted to be moved from an out-of-the-way-position thereon to an active position in which it projects from the truck, and leverage means for connection between said arm or frame and an object to be loaded and adapted to be manually operated to tilt said object onto the truck.

5. The combination with a hand truck, of a rigid arm or frame pivotally connected to said truck for movement from an out-of-the-way-position to an active position in which it projects from the truck, and leverage means for connection between said arm or frame and an object to be loaded and adapted to be manually operated to tilt said object onto the truck.

6. The combination with a hand truck, of a rigid arm or frame pivotally connected to said truck for movement from an out-of-the-way-position to an active position in which it projects from the truck, and a block and tackle for connection between said arm or frame at its projecting end in its active position and an object to be loaded and adapted to be manually operated to tilt said object onto the truck.

In testimony whereof I have signed this specification in the presence of two subscribing witnesses.

ERBIE B. KING.

Witnesses:
R. M. KAUFFMANN,
LEROY W. HERRON.

---

Copies of this patent may be obtained for five cents each, by addressing the "Commissioner of Patents, Washington, D. C."